May 8, 1951 G. VAN DAAM 2,552,075
HEATING DEVICE FOR AIRPLANES
Filed Aug. 5, 1944 2 Sheets—Sheet 1
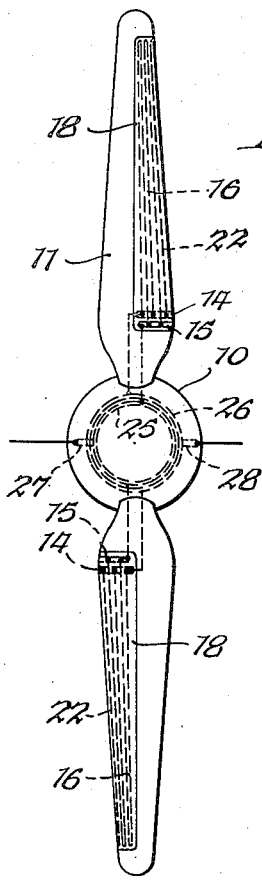
Fig. 1.
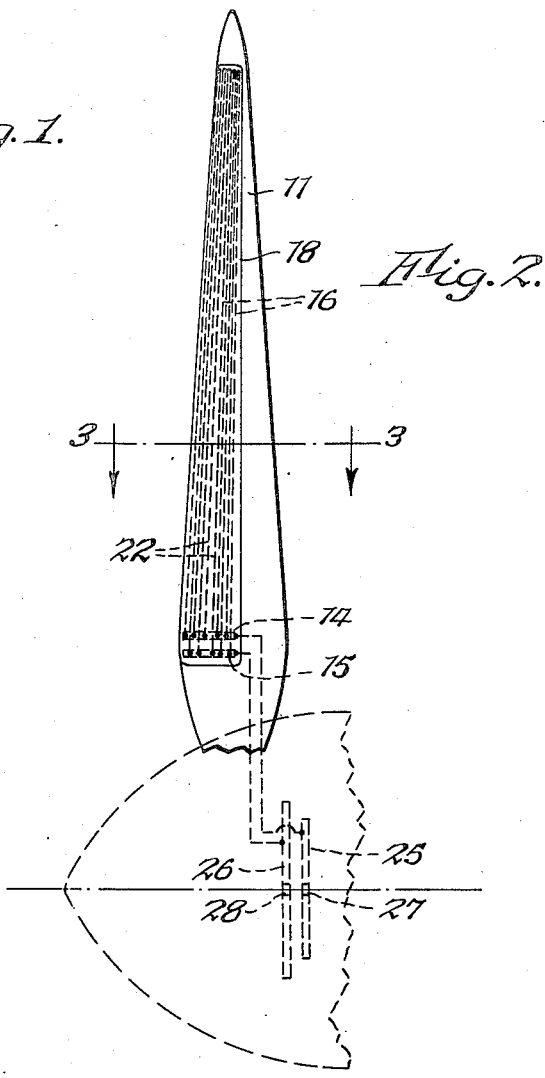
Fig. 2.
Fig. 3.
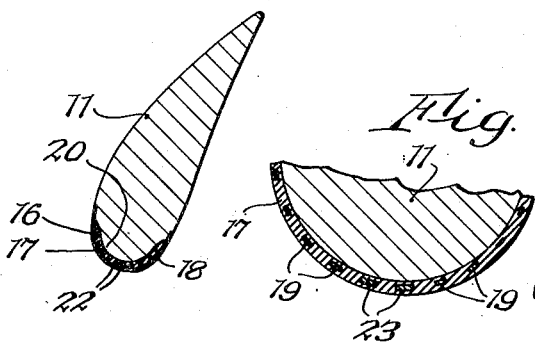
Fig. 4.
INVENTOR.
Gerrit Van Daam,
BY Parker, Prochnow & Farmer
Attorneys May 8, 1951 G. VAN DAAM 2,552,075
HEATING DEVICE FOR AIRPLANES
Filed Aug. 5, 1944 2 Sheets-Sheet 2

INVENTOR.
Gerrit Van Daam,
BY Parker, Prochnow & Farmer,
Attorneys

Patented May 8, 1951

2,552,075

UNITED STATES PATENT OFFICE 2,552,075

HEATING DEVICE FOR AIRPLANES

Gerrit Van Daam, Buffalo, N. Y.; Catherine Van Daam executrix of said Gerrit Van Daam, deceased Application August 5, 1944, Serial No. 548,192

5 Claims. (Cl. 244—134)

This invention relates to improvements in means for heating certain parts of airplanes to prevent the formation of ice thereon or to melt ice which has been formed.

Various types of electric heaters have been provided for use on airplane wings which have, however, not gone into commercial use for various reasons, and one of the objects of this invention is to provide superior electrical heating means for use on various parts of an airplane.

Another object of this invention is to provide heating elements for use on various parts of an airplane and which are so arranged that those portions of the airplane which are most subject to icing may be heated to a greater extent than adjacent parts.

It is also an object of this invention to provide heating means capable of use on the blades of an airplane propeller.

Other objects and advantages of this invention will appear from the following description and claims.

In the accompanying drawings:

Fig. 1 is a front view of an airplane propeller having heating means embodying this invention applied thereto.

Fig. 2 is a fragmentary side view on a larger scale of the propeller shown in Fig. 1.

Fig. 3 is a section of the propeller blade on line 3—3, Fig. 2.

Fig. 4 is an enlarged fragmentary sectional view of the edge portion of a propeller blade of modified construction.

Figure 5:
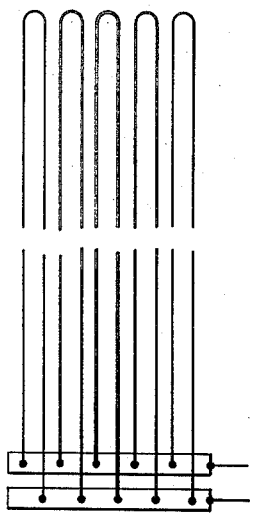
Fig. 5 is a diagram of connections of the heating elements.

In Figs. 1 to 5, I have illustrated my invention as applied to airplane propellers. In this construction, 10 represents the hub of an airplane propeller and 11 the blades thereof which may be secured to the hub in any suitable or desired manner and which may be of any desired construction.

My improved heating means which are applied to the propeller blades comprise a series of metallic conductors of any suitable resistance wire which generates heat when the current of electricity passes therethrough. These resistance wires extend lengthwise of the propeller blade and may be suitably secured to the propeller blade in any desired manner. These conductors are connected in parallel, and for this purpose, a pair of main conductors or bus bars 14 and 15 are provided near the hub 10 of the propeller which are suitably secured to the propeller and insulated from each other. Any desired number of conductors 16 of resistance wire may be connected to the main conductors or bus bars 14 and 15. Each of the heating conductors 16 may be formed of a single wire extending from one of the main conductors toward the tip of the wing, and then bent back on itself, and extending back to the other main conductor. In other words, each conductor as shown forms an elongated loop with the two halves of the conductor extending in close proximity to each other. The conductors may, however, extend back and forth several times, if desired. These conductors are preferably covered with suitable electrical insulation which is also a good conductor of heat, and any of the well known plastic compositions may be employed for this purpose, some of the synthetic rubber-like compositions having been found very satisfactory for this purpose in case relatively low-heating temperatures are employed. The heating elements or conductors 16 may be secured throughout their length to the propeller blade in any suitable or desired manner. For example, the heating element 16 may be embedded in a plastic composition or cement 17 which may be of such a nature that this material itself forms on its outer surface a part of the airfoil of the propeller blade. If desired, a metal shield or covering 18 may be applied to the propeller blade so as to cover the cement or plastic composition 17, in which case, the metal covering forms a part of the airfoil of the propeller blade.

The conductors 16 may be designed so that they are capable of developing high temperatures, and in that case, the embedding material may be of a refractory composition.

In order that the heating elements and the composition in which they are embedded may occupy the minimum of space on the leading edge of a propeller blade, the conductors 16 may be in the form of flat wires, or wires of rectangular cross section, as illustrated at 19 in Fig. 4.

My improved heating means may be applied to the exterior surface of a propeller blade so that any propeller blade, even though not constructed to receive the heating means, may be easily provided with my improved heating means, or a propeller blade may be specifically designed and constructed to receive my improved heating means, namely, by forming a shallow recess 20 in the portion of the propeller blade which is most subject to icing. The recess may be of such depth that my improved heating means may be located within this recess. The plastic composition may then be formed to constitute a part of the airfoil of the propeller blade, or if desired, a metallic sheath 18 may be provided which covers the recess and the conductors embedded therein.

I have also found it very desirable to provide means whereby additional heating may be applied to those portions of propeller blades which are most susceptible to icing. The parallel connection of the heating elements described lends itself particularly well for applying varying degrees of heat to different parts of a propeller blade, and I preferably accomplish this by providing at least one conductor or heating element of larger cross sectional area or of lower resistance so that this element will carry more current and generate more heat than the other elements. Such elements of greater heating capacity are illustrated at 22 in Figs. 1 to 3 and at 23 in Fig. 4. The other elements may be all of the same cross section or heating capacity, or they may vary from each other so that the desired heating effect can be produced.

The invention thus far described has the advantage that it is entirely reliable and efficient for use in the heating of airplane propeller blades, for the reason that the heating elements extend lengthwise of the propeller blades. Consequently, if the ends of the heating elements adjacent to the propeller hub are securely connected to the main conductors 14 and 15, and if these conductors are securely anchored on the propeller, then the centrifugal force will act in the direction of the length of the heating elements, so that the centrifugal action will in no way affect the operation of the heating means, the resistance wire being amply strong enough to withstand the forces to which it is exposed due to centrifugal action, and the heating elements also serve as a reinforcement for any embedding material, which may be employed for holding the heating elements in place.

The conductors 14 and 15 which carry the current to the various heating elements may receive electric current from any suitable source of power, for example, through collector rings 25 and 26 which may be mounted in the propeller hub, with which suitable brushes 27 and 28 may cooperate which are mounted on a fixed part of the fuselage or propeller mounting and to which current is supplied from any suitable source.

Figure 6:
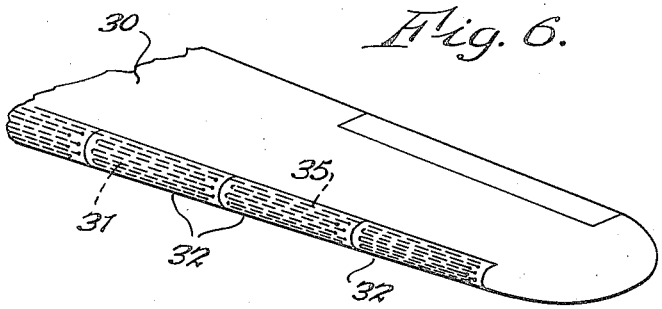
Fig. 6 is a fragmentary perspective view of an airplane wing having heating elements embodying this invention applied thereto.
Figure 7:
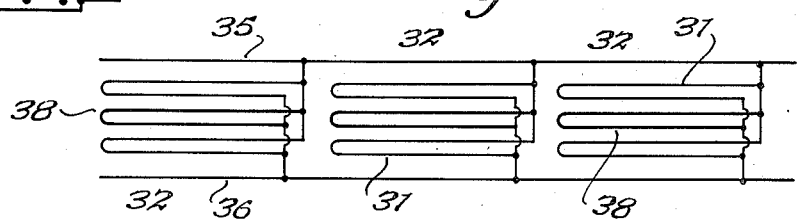
Fig. 7 is a diagram of connections of the heating elements used in the wing shown in Fig. 6.
Figure 8:
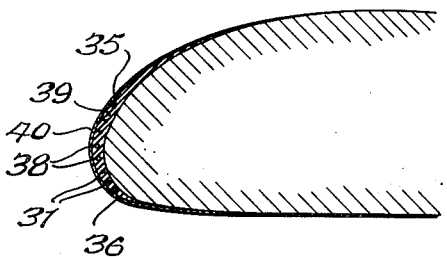
Fig. 8 is a fragmentary sectional view, on an enlarged scale, of an airplane wing showing the improvements embodying this invention applied thereto.

My improvements may also be applied to any other airplane parts which are subject to icing, such for example as the tail structure and the wings, and I have by way of example shown in Figs. 6 to 8 how my invention may be applied to an airplane wing 30. If the wing is of such length that the heating elements 31 cannot be made of such length as to extend throughout the full length of the leading edge of airplane wings, such elements may be arranged in a plurality of groups 32 and each group may be connected to longitudinally extending conductors 35 and 36, the ends of which may be connected in any suitable manner with a source of electric current. Of the heating elements, the middle element 38 of each group may be made of heavier gage resistance or heating wire than the other elements 31, and this heavier wire which generates greater heat may be applied to that portion of the leading edge of the wing which is most susceptible to icing. The elements may be applied to the leading edge of the wing in the same manner as they are applied to the propeller blades, namely, by embedding them in a suitable cement or plastic body 39, the outer surface of which may form a part of the airfoil of the wing, and if desired, a metal sheet 40 may be applied to the exterior surface. The wing may, of course, be recessed, to receive the heating elements and the conductors 35 and 36, or the heating elements may be applied to the leading edge of a wing which has not been recessed to receive the same. Flat wires may be employed to reduce the thickness of the heating means applied to the wing, as described in connection with the propeller heating means.

The heating means described are very efficient in use and may be easily applied to any part of an airplane which is subject to icing. My improved heating means may also be used to selectively apply more heat to certain parts of an airplane than to other parts, so that icing of the plane can be most effectively and economically prevented.

I claim as my invention:

1. An airplane wing having a plurality of insulated metallic conductors arranged lengthwise along the leading edge thereof in heat conducting relation to its exterior surface, said conductors being connected in parallel to a source of electric current supply, and a covering of plastic material in which said conductors are embedded, at least one of said conductors being of lower resistance than the others to generate more heat, and being arranged on the part of the wing which is most susceptible to icing.

2. An airplane propeller having a plurality of propeller blades, a pair of bus bars secured to each of said propeller blades at the parts thereof adjacent to the axis of rotation of the propeller and in heat conducting relation to the outer surfaces of said blades, insulated metallic conductors connected in parallel and having their ends secured to said main conductors and arranged lengthwise along the leading edge of each propeller blade, at least one of said conductors having greater heating capacity than other conductors, said last mentioned conductor of greater heating capacity being arranged adjacent to the part of a blade most susceptible to icing and the other conductors being arranged adjacent to said first mentioned conductors.

3. In means for preventing the icing of airplane parts, the combination of an airplane part having a leading edge subject to icing, a series of metallic conductors arranged in heat conducting relation to said leading edges, electrical insulation of good heat conductivity separating said conductors from said airplane part, at least one of said conductors having lower electrical resistance than others to generate greater heat, said lower resistance conductor being arranged lengthwise of that portion of the airplane part which is most susceptible to icing and the other conductors being arranged at parts of said airplane which are adjacent to said lower resistance conductor.

4. In means for preventing the icing of airplane parts, the combination of an airplane part having a leading edge subject to icing, a series of metallic conductors arranged in heat conducting relation to said leading edge, at least one of said conductors having lower electrical resistance than others to generate greater heat, a plastic composition of good heat conductivity in which said conductors are embedded in heat conducting relation to said leading edge of said airplane part, said conductors forming a reinforcement for said plastic composition, said lower resistance conductor being arranged on that part of the airplane which is most susceptible to icing and the other conductors being arranged at parts of said airplane which are adjacent to said lower resistance conductor.

5. An airplane propeller blade having an exterior metal surface at the leading edge of the blade, a plurality of electrical conductors arranged in heat conducting relation to and within said metal surface, bus bars on said propeller blade to which the terminals of said conductors are connected, at least one of said conductors having lower electrical resistance than the other conductors to generate greater heat, said lower resistance conductors being arranged lengthwise of said blade at the leading edge thereof and the other conductors being arranged at parts of said propeller adjacent to said low resistance conductor, and collector rings at the axial portion of said propeller and connected with said bus bars to supply electrical current to said conductors.

GERRIT VAN DAAM.

REFERENCES CITED

The following references are of record in the file of this patent:

UNITED STATES PATENTS

| Number | Name | Date |
| --- | --- | --- |
| 1,237,592 | White | Aug. 21, 1917 |
| 1,795,664 | Mellberg | Mar. 10, 1931 |
| 1,846,468 | Benson | Feb. 23, 1932 |
| 1,949,450 | Brown | Mar. 6, 1934 |
| 2,205,543 | Rideau et al. | June 25, 1940 |
| 2,393,635 | Hubbard | Jan. 29, 1946 |
| 2,402,770 | Poekel | June 25, 1946 |

FOREIGN PATENTS

| Number | Country | Date |
| --- | --- | --- |
| 525,452 | Great Britain | Feb. 19, 1940 |
| 853,799 | France | Dec. 16, 1939 |